(12) United States Patent
Van Der Nat

(10) Patent No.: US 9,097,374 B2
(45) Date of Patent: Aug. 4, 2015

(54) ASSEMBLY FOR TRANSFERRING FLUIDS BETWEEN A VESSEL AND A TURRET STRUCTURE MOUNTED IN SAID VESSEL

(71) Applicant: Bluewater Energy Services B.V., Hoofddorp (NL)

(72) Inventor: Clemens Gerardus Johannes Maria Van Der Nat, The Hague (NL)

(73) Assignee: Bluewater Energy Services B.V., Hoofddorp (NL)

( * ) Notice: Subject to any disclaimer, the term of this patent is extended or adjusted under 35 U.S.C. 154(b) by 0 days.

(21) Appl. No.: 14/200,473

(22) Filed: Mar. 7, 2014

(65) Prior Publication Data

US 2014/0261826 A1   Sep. 18, 2014

(30) Foreign Application Priority Data

Mar. 12, 2013   (EP) ..................................... 13158775

(51) Int. Cl.
  *B63B 21/50*   (2006.01)
  *B63B 22/02*   (2006.01)
  *F16L 27/08*   (2006.01)
  *B63B 27/24*   (2006.01)
(52) U.S. Cl.
  CPC ........... *F16L 27/0804* (2013.01); *B63B 21/507* (2013.01); *B63B 22/02* (2013.01); *B63B 27/24* (2013.01)
(58) Field of Classification Search
  CPC ...... B63B 21/00; B63B 21/50; B63B 21/507; B63B 22/00; B63B 22/02
  USPC .................................. 114/230.12; 441/3, 4, 5
  See application file for complete search history.

(56) References Cited

U.S. PATENT DOCUMENTS

| 3,605,668 | A | | 9/1971 | Morgan |
| 5,755,531 | A | | 5/1998 | Ferreira |
| 5,823,837 | A | * | 10/1998 | Boatman et al. ................... 441/5 |
| 5,857,808 | A | | 1/1999 | De Baan |
| 6,093,068 | A | | 7/2000 | Turner |
| 6,193,574 | B1 | * | 2/2001 | Pollack ............................. 441/4 |
| 6,588,357 | B1 | | 7/2003 | Hobdy |
| 2004/0244986 | A1 | | 12/2004 | Poldervaart |
| 2011/0061582 | A1 | | 3/2011 | Braud |
| 2011/0092115 | A1 | | 4/2011 | Braud et al. |

FOREIGN PATENT DOCUMENTS

WO   9917983   4/1999

OTHER PUBLICATIONS

Search Report for corresponding foreign application EP13158775.0, filed Mar. 12, 2013.

* cited by examiner

*Primary Examiner* — Lars A Olson
(74) *Attorney, Agent, or Firm* — Steven M. Koehler; Westman, Champlin & Koehler, P.A.

(57) ABSTRACT

An assembly for transferring fluids between a vessel and a turret structure mounted in said vessel for a rotation around a substantially vertical turret axis is provided. Said turret structure comprises a swivel having at least one fluid path which is connected with one end of a fluid piping of which the second end is connected to the vessel. A swivel tower mounts around the swivel and engages the remainder of the turret structure by a swivel tower bearing. A torsion lock mechanism substantially locks the swivel tower to the vessel for a rotation therewith. A first fluid piping segment extends freely between the vessel and the swivel tower and a second fluid piping segment extends between the swivel tower and the fluid path of the swivel. The segments are joined at an interconnection where the fluid piping is substantially fixed to the swivel tower by fixing device.

15 Claims, 3 Drawing Sheets

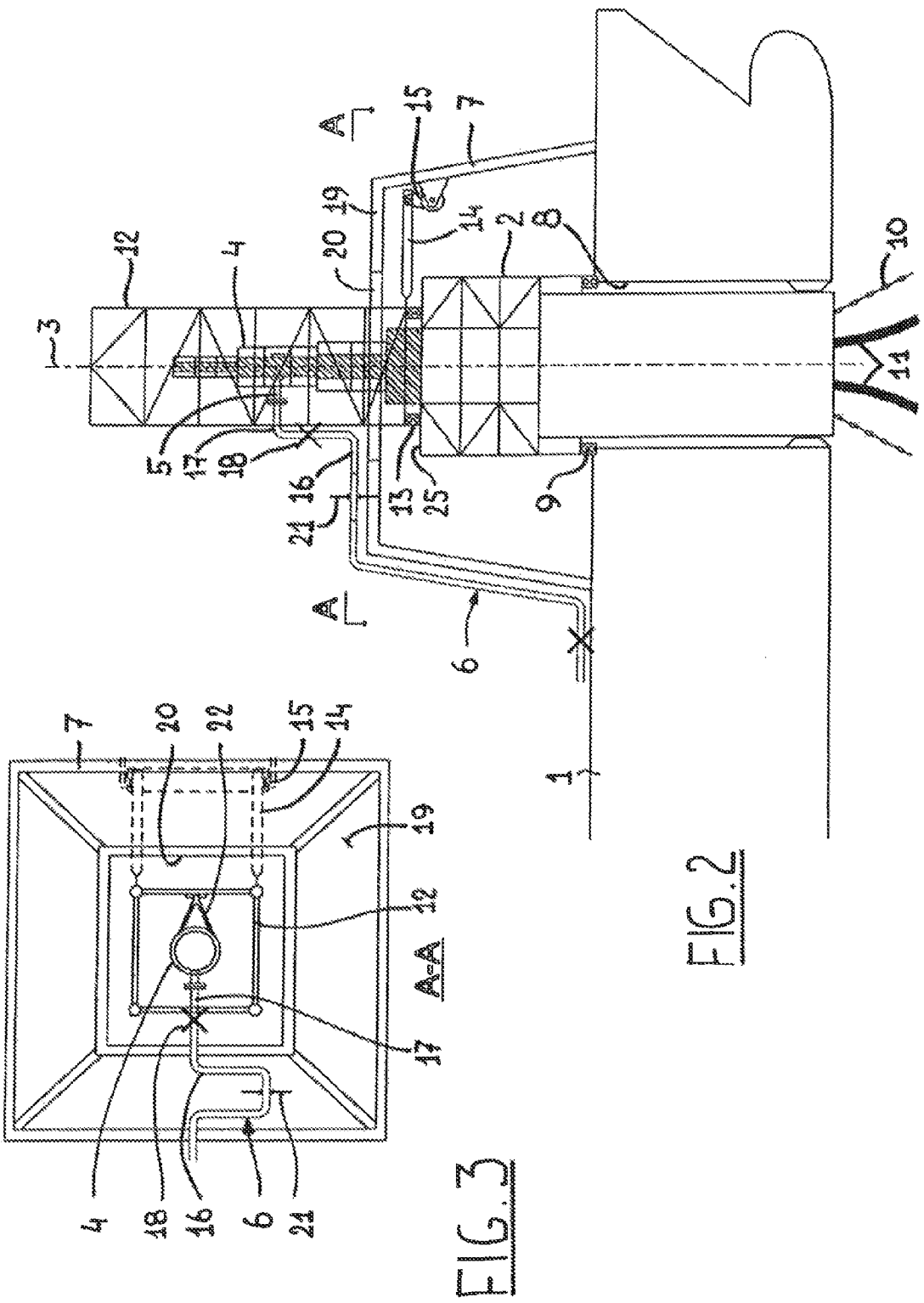

ASSEMBLY FOR TRANSFERRING FLUIDS BETWEEN A VESSEL AND A TURRET STRUCTURE MOUNTED IN SAID VESSEL

BACKGROUND

The discussion below is merely provided for general background information and is not intended to be used as an aid in determining the scope of the claimed subject matter.

Aspects of the invention relate to an assembly for transferring fluids between a vessel and a turret structure mounted in said vessel for a rotation around a substantially vertical turret axis, wherein said turret structure comprises a swivel having at least one fluid path and wherein the fluid path is connected with one end of a fluid piping of which the second end is connected to the vessel.

It is noted that the indication "vessel" also may refer to parts or a structure fixed to the vessel.

It is known in the offshore industry (and especially the production of fluids such as oil or gas) to use vessels comprising a turret structure mounted in a moon pool for a rotation around a substantially vertical turret axis. The turret structure (or a disconnectable buoy connected to a lower part thereof) may be moored to the seabed by mooring lines and connects risers through which the fluid is delivered to a fluid inlet in the geostationary part of the swivel, which typically is mounted on top of the turret structure or on top of a so-called turntable which is based on and forms part of the turret structure. The fluid is transferred from the rotating part of the swivel to appropriate equipment on board of the vessel through fluid piping connecting the swivel fluid outlet with the vessel (for example a so-called turret access structure, TAS, carrying a tower structure surrounding the swivel). It is noted that the fluids can be transferred in two directions, both from the risers to the vessel and vice versa. For clarity only the direction towards the vessel is mentioned here, but it should be realised that the indications "inlet" and "outlet" are interchangeable.

The turret structure, including its turntable, the swivel as well as the vessel (for example the TAS) often are subject to considerable loads tending to deform said components. The loads can originate from, among others, gravity, motions, accelerations, vessel deformations, temperature differences, pressure, mooring forces, riser forces, waves, current and wind. Because these components generally have a different stiffness and will be subjected to different loads, their deformations will be different causing relative displacements between these components.

The relative deformations between the rotating part of the swivel and the vessel (or TAS) deform the fluid piping between them, which causes stresses on the swivel and its outlets. These stresses can be low when the piping is flexible and it thus easily conforms to the relative deformations, but can also be very high when the piping is substantially rigid, for example for high pressure piping with a large diameter. These stresses can interfere with the operation of the swivel, for example by damaging it or causing its seals to leak.

Known practice for reducing the mentioned stresses is to increase the flexibility of the fluid piping (for example by allowing multiple bends in the fluid piping with long piping sections between successive bends), together with anchor points for the fluid piping sufficiently far away from the swivel. However, adding such fluid piping lengths is expensive and increases the overall weight acting on top of the vessel or TAS, further increasing the detrimental deformation thereof with resulting increase of the relative deformation between the vessel (or TAS) and the swivel.

Another known practice for reducing these stresses is to increase the stiffness of the components (such as the turret structure and the TAS) in order to reduce their (relative) deformations. This, however, involves the use of extra material (such as steel) with an associated increase of cost and weight.

The effectiveness of the above known stress reduction methods decreases when the structures (TAS, vessel, turret, swivel etc) increase in size. Larger structures will undergo larger relative deformations, while more steel is required to stiffen them and/or more piping bends and lengths are needed to accommodate the relative deformations. This becomes prohibitive in terms of the required amount of constructive material (steel, piping), mass and cost.

In view of the above it is an object of the present invention to provide an improved assembly of the type referred to above.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The assembly referred to above further comprises a swivel tower mounted around the swivel and engaging the remainder of the turret structure by means of a swivel tower bearing for a relative rotation with respect to said remainder of the turret structure around the turret axis, wherein said swivel tower by means of a torsion lock mechanism is substantially locked to the vessel for a rotation therewith, and wherein the fluid piping comprises a first fluid piping segment extending freely between the vessel and the swivel tower and a second fluid piping segment extending between the swivel tower and the fluid path of the swivel and wherein said first and second fluid piping segments are joined at an interconnection where the fluid piping is substantially fixed to the swivel tower by fixing device(s).

Because the swivel tower engages the remainder of the turret structure directly through the swivel tower bearing and because the swivel is part of the turret structure, relative displacements between the swivel tower and swivel are greatly reduced and the second fluid piping segment will not be subjected to substantial deformations, as a result of which loads on the swivel caused by deformations will be minimised. The loads in the first fluid piping segment (which due to its free extension is capable of being deformed) which are caused by the relative deformations between the vessel and the swivel tower are carried by the swivel tower and substantially transferred to the turret structure through the swivel tower bearing and thus will not reach the swivel.

The fluid piping is fixed to the swivel tower at the interconnection between the first and second fluid piping segments (through the fixing device(s)), that means in a stationary (substantially rigid) manner. For example, the fixing device(s) may comprise fluid piping support points which are placed on the swivel tower to relieve deformation loads (acting mainly in the first fluid piping segment and caused by the relative displacements between components, as elucidated before) on the swivel.

Further, because the deformations between the swivel tower and swivel are very limited, so-called driving arms for the swivel may be provided between the swivel tower and the swivel which have smaller capacities for deflections than driver arms normally applied between the vessel and the swivel. Now only a single driving arm with larger capacities for deflections is required for connecting the swivel tower to the vessel (and thus defining the torsion lock mechanism).

A further advantage of the use of such a swivel tower is, that compared with a state of the art in which a tower structure is supported by a turret access structure, such a turret access structure now will have a lower center of gravity because such a tower structure is replaced by the swivel tower which rests on the turret structure. Thus, such a turret access structure will be subjected to smaller loads and may be constructed lighter and less costly. It is even possible to fully eliminate such a turret access structure.

The swivel tower also may serve to provide access to the swivel for maintenance, inspection etc.

As mentioned, the swivel tower is substantially locked to the vessel by a torsion lock mechanism which ensures that the swivel tower and the vessel rotate in unison. Said torsion lock mechanism may be passive or active. It is noted that "locked to the vessel" does not exclude the possibility of a (moderate) limited relative rotation between the swivel tower and the vessel.

In case the relative deformations between the swivel and the swivel tower still would be significant, for example when their axes of rotations are slightly misaligned, a fluid piping loop can be placed in or around the swivel tower. This loop has sufficient flexibility to accommodate such relative deformations without introducing unacceptable stresses on the swivel.

In one embodiment of the assembly the vessel comprises a turret access structure positioned adjacent the turret structure and comprising a deck member which extends substantially across the turret structure and which is provided with an opening for the free passage of the swivel with surrounding swivel tower, wherein the first fluid piping segment extends between the swivel tower and said deck member.

The deck member of such a turret access structure then serves as a landing point for the first fluid piping segment, wherein the prolongation of such first fluid piping segment towards the vessel may be supported by the turret access structure, for example using at least one piping guide for guiding the fluid piping.

It is possible that the fluid piping at such a piping guide extends loop-shaped, thus increasing the possibility of the fluid piping to conform to deformations between the vessel and the swivel tower.

Preferably, the piping guide allows a relative displacement of the fluid piping. Further it is possible that the at least one piping guide is provided on the deck member.

In another embodiment the torsion lock mechanism is supported by the turret access structure, thus also using said turret access structure for this function.

In an alternative embodiment of the assembly the swivel tower is provided with an extension extending in a direction away from the turret axis, wherein part of the first fluid piping segment is supported by said extension and wherein another part of said first fluid piping segment extends freely between said extension and the vessel.

When using such an extension, a turret access structure providing an opening for the passage of the swivel and swivel tower is not required.

Also in such an embodiment it is possible to provide the extension of the swivel tower with at least one piping guide for guiding the fluid piping which, preferably, allows a relative displacement of the fluid piping.

In another embodiment the swivel tower, at a level above the swivel tower bearing, is provided with at least one auxiliary bearing engaging the swivel. Such a bearing (which engages the swivel or swivel parts) may also be carried out as a so-called driving-arm.

When the swivel tower bearing connects the swivel tower to the swivel in such a manner that the swivel tower and swivel define a unitary member which can be lifted by lifting the swivel tower (thus, when the swivel tower bearing is capable of carrying loads arising from such a manipulation of the swivel tower without being taken apart), it is possible to mount or dismount such a unitary member in a single step as a single part. This allows, for example, to already completely assemble the swivel at the factory by highly qualified persons (reducing the risk of an incorrect assembly thereof when carried out in the vessel). Such a unitary member already may be provided with all necessary equipment and piping and only has to be connected to corresponding equipment and piping of the vessel.

The swivel tower bearing may be located above or below the level of a fluid inlet of the swivel, or may be located substantially at the level of a fluid inlet of the swivel. Such a fluid inlet also is referred to as an inlet collector. The specific choice may depend from other design choices and from specific requirements.

In an embodiment the swivel tower bearing is positioned on a (possibly enlarged) swivel base part. Thus there may be provided a swivel base part with a diameter which is larger than the diameter of the remainder of the swivel, wherein the swivel tower bearing is positioned on said swivel base part. This increases the stability of the swivel tower (with respect to the swivel) and further reduces deformations between the swivel and the swivel tower.

BRIEF DESCRIPTION OF THE DRAWINGS

Hereinafter aspects of the invention will be elucidated while referring to the drawing, in which:

FIG. 2 schematically shows a first embodiment of the assembly;

FIG. 3 shows a cross-section according to A-A in FIG. 2, and

DETAILED DESCRIPTION OF THE ILLUSTRATIVE EMBODIMENTS

Figure 1:
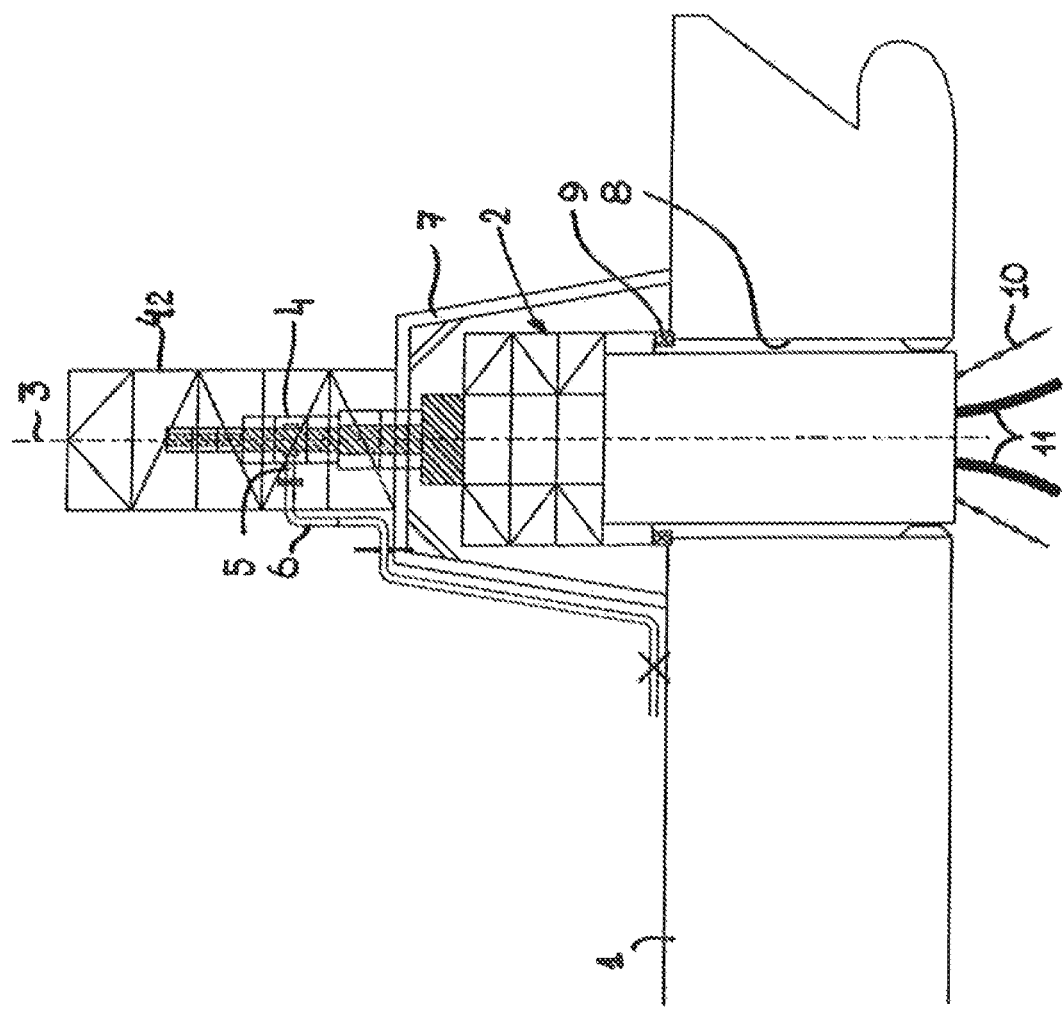
FIG. 1 schematically shows a state of the art assembly.

Firstly referring to FIG. 1, a state of the art assembly is illustrated for transferring fluids between a vessel 1 and a turret structure 2 mounted in said vessel for a rotation around a substantially vertical turret axis 3. In its upper part the turret structure 2 comprises a swivel 4 having at least one fluid outlet 5 which is connected to one end of a fluid piping 6 of which the second end is connected to the vessel 1 or to a structure 7 (for example a so-called turret access structure TAS) fixed to the vessel.

The turret structure 2 is mounted in a moonpool 8 by means of a turret bearing 9 and is moored to the seabed by mooring lines 10. Risers 11 extend from the seabed through the turret structure and are connected to a lower part (swivel fluid inlet, not shown in detail) of the swivel 4, whether or not through a process manifold.

The turret structure 2 allows the vessel 1 to weathervane around the turret structure 2, as is generally known. The lower part of the turret structure 2 may be embodied as a disconnectable buoy part, as is generally known.

The illustrated state of the art assembly further comprises a tower structure 42 supported by the structure 7. Because this tower structure 42 is supported by the structure 7, it will experience the same large relative deformations with respect to the swivel 4 as is the case for the vessel 1.

Figure 4:
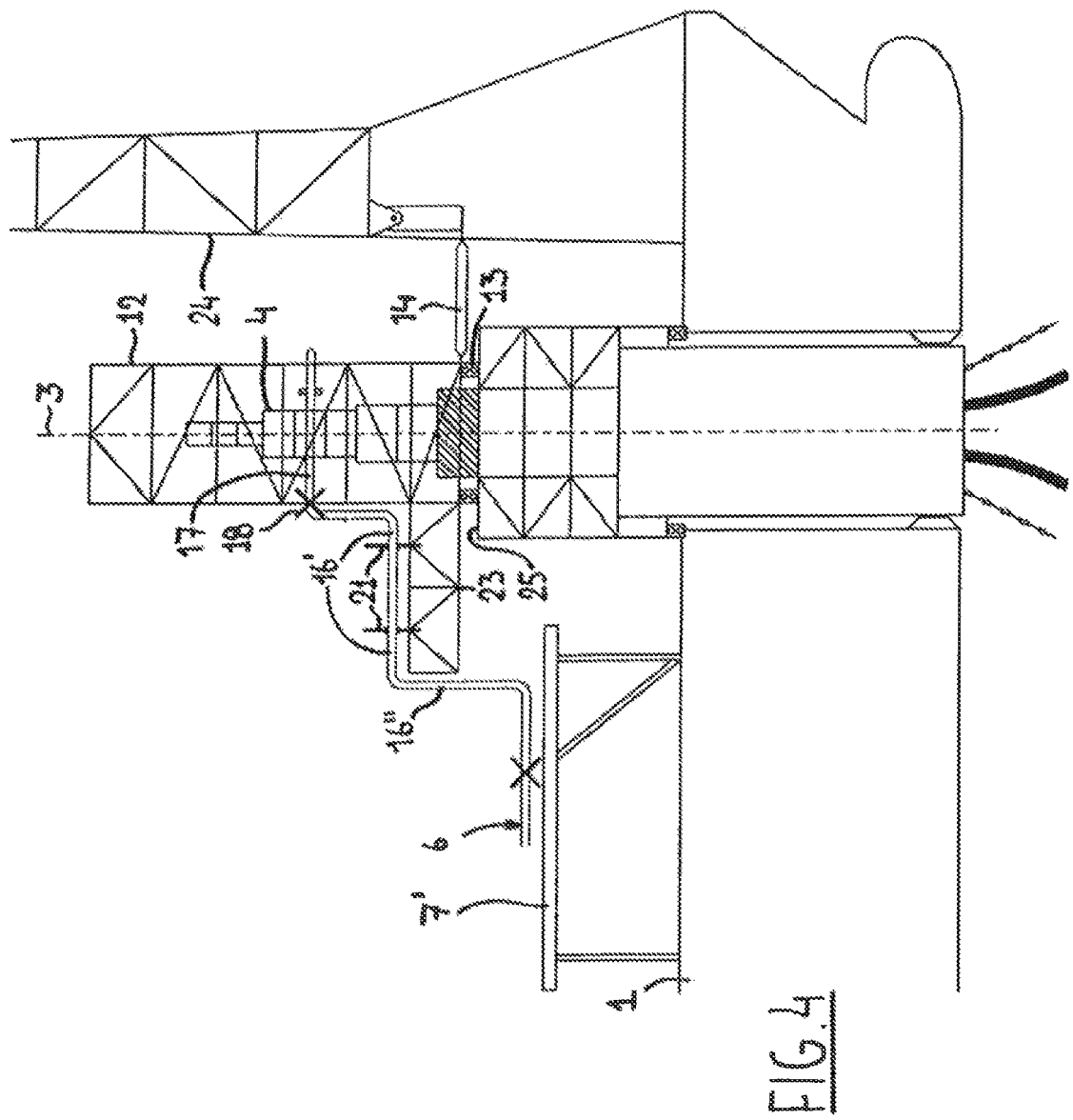
FIG. 4 schematically shows a second embodiment of the assembly.

As will appear from the following description of embodiments of the assembly while referring to FIGS. 2-4, such an assembly further comprises a swivel tower 12 mounted around the swivel 4 and engaging the remainder of the turret structure 2 by means of a swivel tower bearing 13 for a relative rotation with respect to said remainder of the turret structure around the turret axis 3.

Firstly referring to FIG. 2, one can see that the swivel tower 12 by means of a torsion lock mechanism 14 is substantially locked to the vessel 1 (or, in the present embodiment, to a turret access structure 7 to be elucidated below) for a rotation therewith. Such a torsion lock mechanism 14 substantially prevents a relative rotational displacement between the vessel 1 and the swivel tower 12 while allowing a displacement there between caused by relative deformations (for example by using a hinging mechanism 15).

The fluid piping 6 extending between the swivel 4 and the vessel 1 comprises a first fluid piping segment 16 extending freely between the vessel 1 (or, in the present embodiment, the turret access structure 7 attached to the vessel 1) and the swivel tower 12 and a second fluid piping segment 17 extending between the swivel tower 12 and the fluid outlet 5 (fluid path) of the swivel 4.

Said first and second fluid piping segments 16,17 are joined at an interconnection where the fluid piping is fixed to the swivel tower by fixing device 18 in a stationary (substantially rigid) manner. For example, the fixing device 18 may comprise fluid piping support points which are placed on the swivel tower 12 to relieve deformation loads (acting mainly in the first fluid piping segment 16 and caused by the relative displacements between the vessel 1 and the swivel tower 12) on the swivel 4.

In the embodiment illustrated in FIG. 2 the turret access structure 7 is positioned adjacent the turret structure 2 and comprises a deck member 19 which extends substantially across the turret structure 2 and which is provided with an opening 20 for the free passage of the swivel 4 with surrounding swivel tower 12. The first fluid piping segment 16 extends between the swivel tower 12 and said deck member 19. The part of the fluid piping 6 connecting to the first fluid piping segment 16 and to the vessel 1 is guided by at least one piping guide 21 provided on the deck member 19 of the turret access structure 7. Other piping guides may be provided too.

As illustrated in FIG. 3, the fluid piping 6 at the piping guide 21 extends loop-shaped. Further this figure shows a known drive arm 22 for the swivel 4.

Now referring to FIG. 4, an embodiment of the assembly is illustrated wherein the swivel tower 12 is provided with an extension 23 extending in a direction away from the turret axis 3. Part 16' of the first fluid piping segment is supported by said extension 23 (for example using piping guides 21) wherein another part 16" of said second fluid piping segment extends freely between an outer end of said extension 23 and the vessel 1 (or, in the illustrated embodiment, a structure 7' being attached to the vessel 1 in a stationary manner).

Also in this embodiment a torsion lock mechanism 14 is provided between the swivel tower 12 and the vessel 1 (in this embodiment a forward tower 24 of the vessel).

In both embodiments described above the swivel tower bearing 13 is positioned on an enlarged swivel base part 25, as a result of which the position of the swivel tower 12 is very stable.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An assembly for transferring fluids between a vessel and a turret structure mounted in said vessel for a rotation around a substantially vertical turret axis, wherein said turret structure comprises a swivel having at least one fluid path and wherein the fluid path is connected with one end of a fluid piping of which the second end is connected to the vessel, wherein the assembly further comprises a swivel tower mounted around the swivel and engaging the remainder of the turret structure by a swivel tower bearing for a relative rotation with respect to said remainder of the turret structure around the turret axis, wherein a torsion lock mechanism substantially locks the swivel tower to the vessel for a rotation therewith, and wherein the fluid piping comprises a first fluid piping segment extending freely between the vessel and the swivel tower and a second fluid piping segment extending between the swivel tower and the fluid path of the swivel and wherein said first and second fluid piping segments are joined at an interconnection where the fluid piping is substantially fixed to the swivel tower by fixing device.

2. The assembly according to claim 1, wherein the vessel comprises a turret access structure positioned adjacent the turret structure and comprising a deck member which extends substantially across the turret structure and which is provided with an opening for the free passage of the swivel with surrounding swivel tower, wherein the first fluid piping segment extends between the swivel tower and said deck member.

3. The assembly according to claim 2, wherein the turret access structure is provided with at least one piping guide for guiding the fluid piping.

4. The assembly according to claim 3, wherein the fluid piping at the piping guide extends loop-shaped.

5. The assembly according to claim 3, wherein the piping guide allows a relative displacement of the fluid piping.

6. The assembly according to claim 3, wherein the at least one piping guide is provided on the deck member.

7. The assembly according to claim 2, wherein the torsion lock mechanism is supported by the turret access structure.

8. The assembly according to claim 1, wherein the swivel tower is provided with an extension extending in a direction away from the turret axis, wherein part of the first fluid piping segment is supported by said extension and wherein another part of said first fluid piping segment extends freely between said extension and the vessel.

9. The assembly according to claim 8, wherein the extension of the swivel tower is provided with at least one piping guide for guiding the fluid piping.

10. The assembly according to claim 9, wherein the piping guide allows a relative displacement of the fluid piping.

11. The assembly according to claim 1, wherein the swivel tower, at a level above the swivel tower bearing, is provided with at least one auxiliary bearing engaging the swivel.

12. The assembly according to claim 1, wherein the swivel tower bearing connects the swivel tower to the swivel in such a manner that the swivel tower and swivel define a unitary member which can be lifted by lifting the swivel tower.

13. The assembly according to claim 1, wherein the swivel tower bearing is located above or below the level of a fluid inlet of the swivel.

14. The assembly according to claim 1, wherein the swivel tower bearing is located substantially at the level of a fluid inlet of the swivel.

15. The assembly according to claim 1, wherein the swivel tower bearing is positioned on a swivel base part.

* * * * *